UNITED STATES PATENT OFFICE.

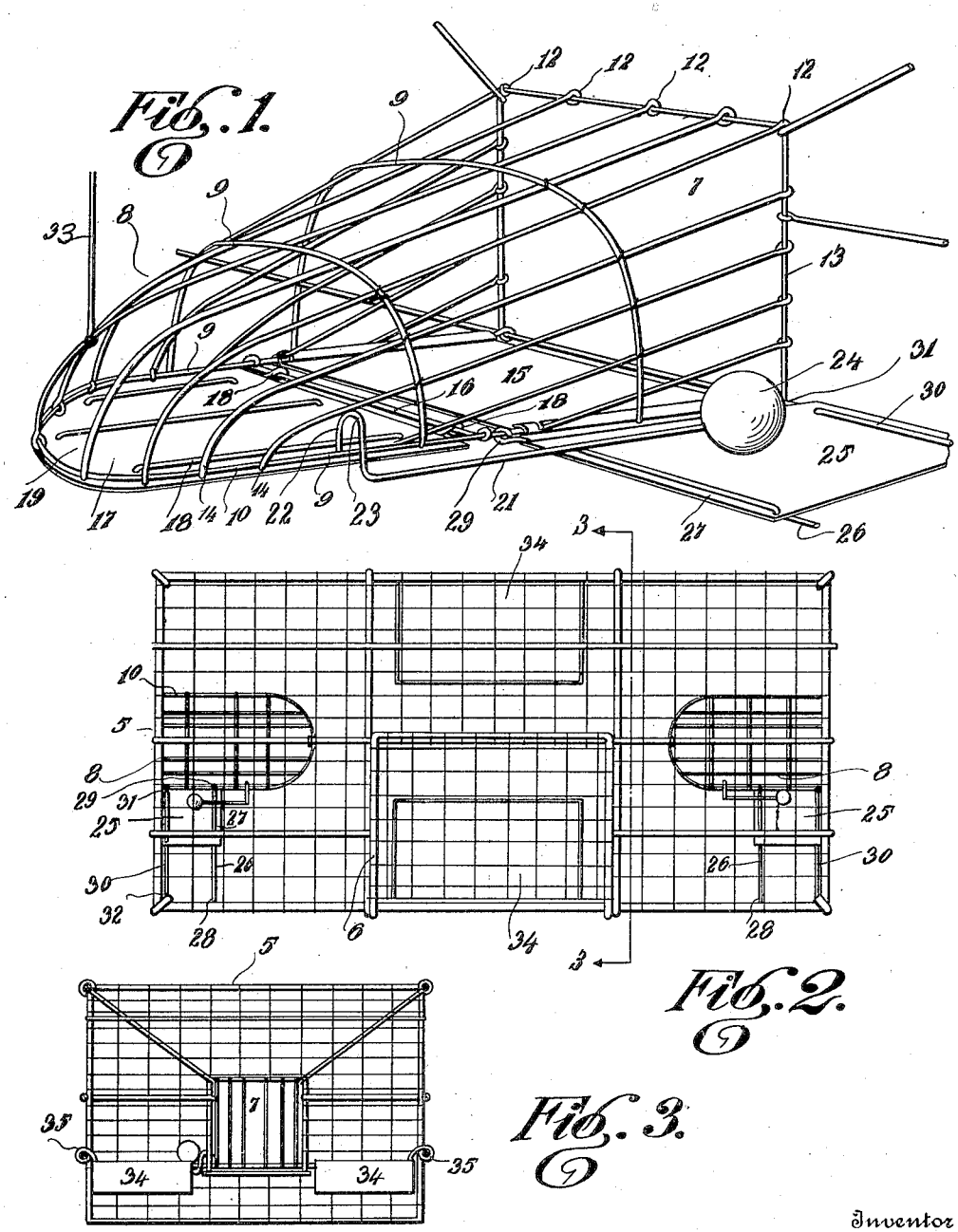

ALLEN DIXON, OF NASHVILLE, TENNESSEE, ASSIGNOR OF ONE-HALF TO WILLIAM N. SANDERS, OF NASHVILLE, TENNESSEE.

TRAP.

1,384,942.  Specification of Letters Patent.  Patented July 19, 1921.

Application filed October 4, 1920. Serial No. 414,549.

*To all whom it may concern:*

Be it known that ALLEN DIXON, a citizen of the United States, residing at Nashville, in the county of Davidson and State of Tennessee, has invented certain new and useful Improvements in Traps, of which the following is a specification, reference being had to the accompanying drawings.

This invention relates to traps and has for its object to provide a trap wherein it is impossible for the rodent to escape by moving the mechanism controlling the tread-plate of the trap.

Another object is to provide a trap of this character having a relatively long hood disposed over the entrance or entrances to the trap, said hood permitting the use of a stationary runway so that the entire weight of the body will be used in operating the tread-plate when the rodent steps thereupon.

Another object is to provide a trap of this character having a novel tread-plate operated by a weight and having a guard plate disposed closely adjacent the weight to prevent opening of the tread-plate by the rodents within the trap.

A still further object of the invention is to provide a trap of this character which will not operate until the entire body of the rodent has passed the entrance opening to the trap thereby making it difficult for the rodent to retreat.

With the above and other objects in view, the invention consists in the improved construction and arrangement of parts to be hereinafter more particularly described, fully claimed and illustrated in the accompanying drawings, in which:

Figure 1 is a perspective view of the entrance hood and trap operating means;

Fig. 2 is a top plan view of the trap;

Fig. 3 is a section taken on the line 3—3 of Fig. 2.

Referring to the drawings, 5 designates a cage composed of a plurality of lengths of wire, the upper portion of the cage being provided with an outlet opening closed by means of a door 6 while each end of the cage is provided with an opening 7. It will be noted that the opening is disposed in spaced relation to the bottom of the trap. The purpose of this is not only to permit the proper operation of the tread-plate, but to require the rodent to fully enter the trap so that when the tread-plate is depressed it will be difficult for the rodent to withdraw from the entrance opening of the trap.

Disposed over the edge of the openings 7, is a hood 8 comprising a pair of brace members 9 and a base frame 10. The wires forming the top of the hood have their ends 12 secured to the top of the frame 13 of the opening 7 while the opposite ends 14 of the wires are extended downwardly over the rear brace 9 and secured to the intermediate portion of the frame 10, the ends of the frame 10 being secured to the frame 13. A plurality of wires, also extend along the side portions of the brace members 9 and are secured at one of their ends to the frame 13 and at their opposite ends to the end 14 of the outermost wires of the top. It will be noted that the hood 8 is relatively long or in other words extends a considerable distance inwardly of the trap. This permits a stationary runway or platform 15 to be secured to the frame 10 of the hood closely adjacent the opening 7 so as to form a portion of the bottom of the hood. This plate does not move at any time but is intended to permit the rodent to readily climb into the hood without operating the tread-plate while doing so. The runway or platform 15 extends to the intermediate portion of the hood and terminates adjacent the shaft 16 which extends laterally of the hood and serves as a bearing member. A tread-plate 17 is provided for closing the remaining portion of the bottom of the hood, one end of said plate being constructed to conform to the curvature of the hood while its opposite end is pivotally connected to the shaft 16 by means of a pair of wires 18. Each of these wires, extends through the end 19 of the plate and longitudinally thereof to the opposite end where they are again passed through the plate, the ends 20 of said wires being looped around the shaft 16 to pivotally connect the plate thereto. By extending the wires 19 longitudinally of the tread-plate, the latter is efficiently braced so that if desired, it may be made of relatively thin material so it will readily respond to any pressure and at the same time to be efficiently braced against bending under the weight of the rodent.

In order to maintain the tread-plate in its closed position or in alinement with the runway 15, a wire 21 is secured to the free end of the tread-plate and is extended longitudinally and centrally of the plate to a point adjacent the pivoted end of the plate and then laterally and through the end portion of the plate in right angular relation thereto as at 22. The wire is then bent substantially U-shaped as at 23 so as to permit the same to extend through the hood and also permit operation of the tread-plate without encountering the frame 10 of the hood. The remaining portion of the wire 21 is extended toward the entrance opening 7 and provided with a weight 24 by means of which the tread-plate is maintained in its closed position.

To prevent rodents that have been trapped from getting beneath and raising the weight and opening the trap, a novel form of guard plate 25 is provided. This plate is considerably larger than the weight 24 so as to render it impossible for the rodent to engage the weight at any point. A wire 26 is passed through the end portion 27 of the plate laterally thereof and has its end 28 secured to the end of the trap adjacent the entrance opening and its end 29 secured to the adjacent side of the trap. A wire 30 is extended through the opposite end portion of the plate similar to the wire 27 and has its end 31 connected to the frame 10 of the hood and its end 32 connected to the adjacent side of the trap. In this way the guard plate is properly positioned closely adjacent the weight when the weight is in its inoperative position. At the same time, the wire 30 prevents the rodent from getting between the side of the guard plate and the adjacent side of the cage. The support of the plate is thereby rendered substantial so that even if the rodent climbs upon the guard plate the same will not be damaged or bent from its position beneath the weight. To render the hood more secure, the brace 33 is extended from the top of the cage to the end brace 9 of the hood so that danger of the weight of the rodent distorting the hood or bending the same is eliminated. In order to prevent bait deposited in the trap from sifting through the bottom thereof when the trap is moved, I provide a plurality of bait boxes 34 which are disposed within the trap and are provided with hooks 35 which are engaged with the sides of the trap. In view of this, all forms of bait may be used without danger of the same passing through the trap.

From the foregoing it will be readily seen that this invention provides a novel form of trap wherein it is impossible for the rodent to depress the tread-plate when only half of its body is disposed within the opening but wherein the rodent must first enter the trap so that its entire body is disposed within the hood before it reaches the tread-plate. In view of this, it is difficult for the rodent to resist entering the trap when the tread-plate is depressed. Furthermore, the rodent is not frightened as soon as it enters the hood, as the plate 15 is stationary and therefore no parts of the device are moved when the rodent is entering the hood. In addition to this, a novel form of guard plate is provided which prevents interference with the weight of the tread-plate so that regardless of the number of rodents within the trap the tread-plate will always operate when depressed.

What is claimed is:—

A trap comprising a cage having an entrance opening in each end, an entrance hood disposed over each of said openings and extending inwardly of the cage, a bearing rod extending laterally of the bottom of the hood, a tread-plate, said plate having a pair of wires extending longitudinally thereof and looped around said rod for movably connecting the tread-plate thereto, a weight wire extending longitudinally and centrally of the tread-plate and then laterally through one side of the hood, a weight on the end of said weight wire, and means for preventing operation of the tread-plate from within the cage.

In testimony whereof I hereunto affix my signature.

ALLEN DIXON.